(12) United States Patent
Krishnamurthy et al.

(10) Patent No.: US 12,477,398 B2
(45) Date of Patent: Nov. 18, 2025

(54) METHOD AND SYSTEM FOR TRANSMITTING IN-BAND CROSS-CHIP TRIGGERS TO MAINTAIN HIGH-SPEED INTERCONNECT

(71) Applicant: NVIDIA Corporation, Santa Clara, CA (US)

(72) Inventors: Adithya Hrudhayan Krishnamurthy, Sunnyvale, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 408 days.

(21) Appl. No.: 17/968,210

(22) Filed: Oct. 18, 2022

(65) Prior Publication Data
US 2023/0209405 A1      Jun. 29, 2023

Related U.S. Application Data

(60) Provisional application No. 63/294,041, filed on Dec. 27, 2021.

(51) Int. Cl.
*H04W 28/08* (2023.01)
*H04W 28/16* (2009.01)
*H04W 72/23* (2023.01)

(52) U.S. Cl.
CPC ....... *H04W 28/0967* (2020.05); *H04W 28/16* (2013.01); *H04W 72/23* (2023.01)

(58) Field of Classification Search
CPC ..... H04W 28/08; H04W 28/09; H04W 28/16; H04W 72/04; H04W 72/23; H04L 1/00; H04L 1/24; H04L 41/06; H04L 43/08; H04L 7/02; H04L 25/20; G06F 13/14; G06F 13/16; G06F 13/28; G06F 13/42; G06F 13/24; G06F 11/08; G08F 11/16
USPC .......................................................... 370/329
See application file for complete search history.

(56) References Cited

U.S. PATENT DOCUMENTS

| | | | | |
|---|---|---|---|---|
| 7,676,588 | B2* | 3/2010 | Georgiou | G06F 9/5027 710/1 |
| 8,825,922 | B2* | 9/2014 | Mayer | G06F 13/28 714/45 |
| 8,924,619 | B2* | 12/2014 | Cohen | G06F 3/0658 710/33 |
| 10,554,347 | B2* | 2/2020 | Albertson | H04L 1/201 |
| 10,592,452 | B1* | 3/2020 | Barner | G06F 13/4009 |
| 10,831,687 | B2* | 11/2020 | Mikos | G06F 13/4022 |
| 10,915,482 | B2* | 2/2021 | Mikos | G06F 11/006 |
| 11,569,939 | B1* | 1/2023 | Krishnamurthy | H04L 1/0083 |
| 2016/0226624 | A1* | 8/2016 | Shoor | G06F 13/4282 |
| 2022/0085567 | A1* | 3/2022 | Lowder | H01S 3/0675 |

(Continued)

*Primary Examiner* — Man U Phan
(74) *Attorney, Agent, or Firm* — Lowenstein Sandler LLP

(57) ABSTRACT

A system includes a link having one or more data paths and a device coupled with the link and including a data link (DL) transmitter and a buffer. The device is to write one or more bits corresponding to a operation to a first portion of a data frame in response to an indication, the data frame comprising a second portion comprising data. The device is to transmit the first portion and the second portion of the data frame via the one or more data paths in response to writing the one or more bits corresponding to the operation. The device is to store the data frame at the buffer in response to writing the one or more bits corresponding to the operation.

20 Claims, 6 Drawing Sheets

(56) References Cited

U.S. PATENT DOCUMENTS

| | | | |
|---|---|---|---|
| 2022/0214736 A1* | 7/2022 | Shankar | G06F 1/3296 |
| 2023/0153116 A1* | 5/2023 | Nagarajan | G06F 9/3888 |
| | | | 712/7 |
| 2024/0373379 A1* | 11/2024 | Manevich | H04W 56/0015 |

* cited by examiner

METHOD AND SYSTEM FOR TRANSMITTING IN-BAND CROSS-CHIP TRIGGERS TO MAINTAIN HIGH-SPEED INTERCONNECT

RELATED APPLICATION

This application claims the benefit of U.S. Provisional Patent Application No. 63/294,041, filed Dec. 27, 2021, which is incorporated by reference herein in its entirety.

TECHNICAL FIELD

At least one embodiment pertains to processing resources used to perform and facilitate high-speed communications. For example, at least one embodiment pertains to technology for transmitting in-band cross-chip triggers to maintain and debug a high-speed interconnect.

BACKGROUND

Communication systems transmit signals from a transmitter to a receiver via a communication channel or medium (e.g., cables, printed circuit boards, links, wirelessly, etc.) In some communication systems, errors can occur when transmitting the signals from the transmitter to the receiver. Accordingly, communication systems can assess a quality of the communication channel and perform debug operations to ensure the communication channel is reliably transmitting data. In conventional communication systems, a device of the communication system can send a cross-chip trigger (e.g., an indication to perform a debug operation) through a sideband—e.g., over a communication channel or medium not associated with transmitting data. For example, the device can send the cross-chip trigger over a general-purpose pin dedicated to transmitting the triggers. However, the general purpose pin does not maintain timing with the communication channel that communicates data—e.g., the cross-chip trigger can be transmitted asynchronously with respect to the data. This can increase latencies and cause inaccurate debug operations to occur.

BRIEF DESCRIPTION OF DRAWINGS

Various embodiments in accordance with the present disclosure will be described with reference to the drawings, in which.

DETAILED DESCRIPTION

Figure 1:
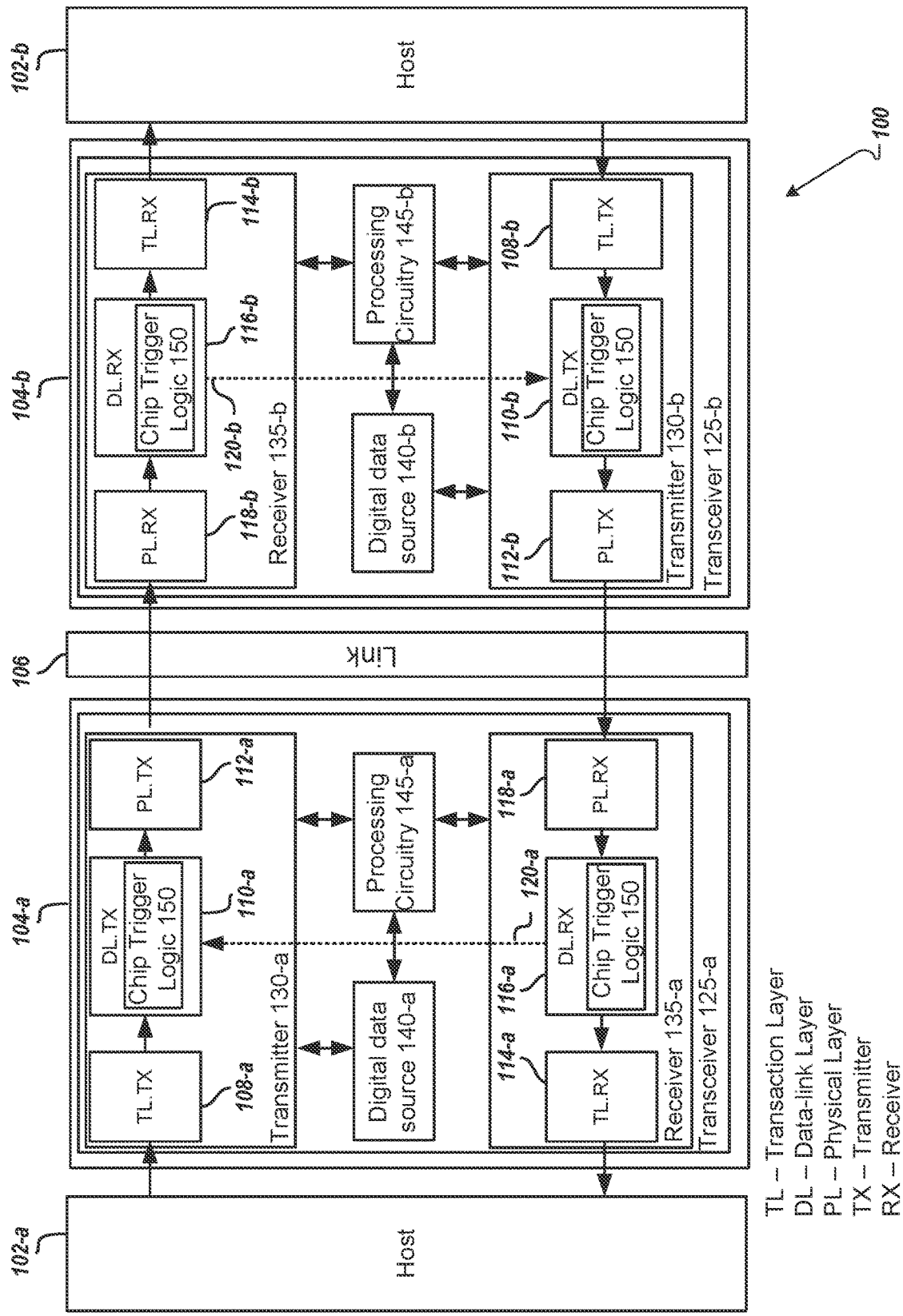
FIG. 1 is an example communication system, in accordance with at least some embodiments.

Communication systems transmit signals from a transmitter to a receiver via a communication channel or medium (e.g., cables, printed circuit boards, links, wirelessly, etc.). For example, a communication system may include a first device (e.g., a first integrated circuit (IC) or chip) and a second device (e.g., a second IC or chip) and communicate data via communication link—e.g., the communication system may be a chip-to-chip (C2C) interconnect with both devices including a transmitter and a receiver. In some communication systems, errors can occur while transmitting data from the first device to the second device over the link. The communication system can perform debug operations or assess a quality of the link. The communication system can further perform a debug operation if issues are found with the link to ensure data is reliably communicated. For example, the first device can transmit a cross-chip trigger to the second device to assess the quality of the link. The cross-chip trigger can enable a debug operation to occur at both the first device, and the second device to assess where potential errors can occur. For example, the first device can transmit a data frame to the second device and the respective software stacks of the first device, and the second device can compare the transmitted data frame at the first device with the received data frame at the second device to assess the quality of the link. Conventional communication systems can transmit the cross-chip trigger along a side-band—e.g., across a communication channel or medium that is not associated with transmitting data. For example, the communication system can include the link for transmitting data and a dedicated general purpose pin at each device for transmitting the cross-chip trigger. However, each device can maintain a timing for the general purpose pin independently of a timing for data transmission. Accordingly, either device can transmit or receive the data and the cross-chip trigger asynchronously—e.g., the device can receive the data frame intended for the debug operation before or after receiving the corresponding cross-chip trigger. For example, the device can receive the cross-chip trigger hundreds of nanoseconds before or after the data associated with the cross-chip trigger. The asynchronous cross-chip trigger can increase latencies or cause inaccurate debug operation. For example, the device can receive the cross-chip trigger first and have to wait to receive the data causing increased latencies. In some communication systems, the device can receive a first data frame corresponding to a cross-chip trigger, then a cross-chip trigger, and then a second data frame and mistakenly perform the debug operation with the second data frame as it was received after the cross-chip trigger.

Advantageously, aspects of the present disclosure can address the deficiencies above and other challenges by providing a method and system for transmitting in-band cross-chip triggers. For example, a first device of a communication system can pack the cross-chip trigger in a data frame at the data-link layer of a transmitter using cross-chip trigger logic. The first device can pack the cross-chip trigger in the data frame in response to receiving a debug trigger (e.g., a trigger from a respective software stack of the device), in response to determining an internal trigger (e.g., data received at the data-link layer of the transmitter from the transaction layer of the transmitter indicates to generate the cross-chip trigger), or in response to an external trigger—e.g., a trigger from hardware outside of the transmitter (e.g., error or debug circuitry). After packing the cross-chip trigger in the data frame, the device can transmit the data frame with the cross-chip trigger across the link (e.g., in-band) and also store the data frame at a buffer of the data-link layer of the transmitter.

In some embodiments, the second device can receive the data frame at a data-link layer of a receiver, decode the data frame, and determine the data frame includes the cross-chip trigger—e.g., identify the cross-chip trigger in the data frame. In such embodiments, the second device can store the data frame at a buffer of the data-link layer of the receiver. A software stack of the second device can communicate with a software stack of the first device after the data frame with the cross-chip trigger is stored at the buffer—e.g., the software stack of the second device can readout the data frame with the cross-chip trigger. For example, the software stack of the second device can indicate a pass or fail (e.g., that the data frame with the cross-chip trigger was received with or without errors) or transmit a message indicating the data contents (for example, through a CRC signature) of the data frame with the cross-chip trigger. The software stack of the first device and the software of the second device can communicate across a second link—e.g., a side-band link not associated with transmitting data. Accordingly, the communication system can perform the debug operation by transmitting the cross-chip trigger in-band from the first device to the second device.

In some embodiments, the second device can receive the data frame with the cross-chip trigger and transmit the data frame with the cross-chip trigger back to the first device—e.g., decode the data frame with the cross-chip trigger, generate a second data frame with the cross-chip trigger that is a copy of the data frame with the cross-chip trigger, and transmit the second data frame back to the first device. The first device can receive the second data frame with the cross-chip trigger at a data-link layer of a receiver. The data-link layer of the receiver of the first device can decode the second data frame and determine the second data frame includes the cross-chip trigger. In such embodiments, the first device can store the second data frame at a buffer of the data-link layer of the receiver. In some embodiments, a controller (e.g., a microcontroller or a finite state machine (FSM)) of the first device can read out the data frame stored at the buffer of the transmitter and read out the second data frame stored at the buffer of the receiver, compare the data frame and the second data frame, and perform debug operations based on the comparison. For example, the controller can determine one or more errors when the data frame is different than the second data frame and transmit an indication to the software stack of the device. In such examples, the software stack can execute debug operations in response receiving the indication—e.g., reset the link based on determining the one or more errors. In some embodiments, the software stack of the first device can read out the data frame and the second data frame, perform the comparison, and execute the debug operation accordingly.

By utilizing the in-band cross-chip trigger, the communication system can perform debug operations more effectively. For example, the cross-chip trigger can be synchronous with the data as both are included in the same data frame when transmitted across the link. Additionally, in some embodiments, the cross-chip trigger in a data frame does not disrupt normal operations as the cross-chip trigger can be included in data frames that are to be transmitted—e.g., in data frames that are in a data pipeline of the device. Accordingly, embodiments of the present application allow for a more reliable method for transmitting in-band cross-chip triggers to maintain and debug a high-speed interconnect.

FIG. 1 illustrates an example communication system 100 according to at least one example embodiment. The system 100 includes a host 102-a, a host 102-b, a first device 104-a, and a second device 104-b. The system 100 also includes a link 106 coupling the first device 104-a and the second device 104-b. Each device 104 may include a transceiver 125 that includes a transmitter 130, a receiver 135, a digital data source 140, and processing circuitry 145. Each transmitter 130 may include a transaction layer (TL) 108, a data-link layer (DL) 110, a physical layer (PL) 112, and each receiver 135 may include TL 114, a DL 116, and a PL 118.

In at least one example, hosts 102 or devices 104 may correspond to one or more of a Personal Computer (PC), a laptop, a tablet, a smartphone, a server, a collection of servers, or the like. In some examples, the hosts 102 may correspond to any appropriate type of device that communicates with other devices and is also connected to a common link 106. In some examples, hosts 102 may transmit commands or data to devices 104. In such examples, devices 104 may communicate data with each other based on commands or data received by the hosts 102. As another specific but non-limiting example, the hosts 102 and devices 104 may correspond to servers offering information resources, services and/or applications to user devices, client devices, or other hosts in the system 100.

In at least one example embodiment, first device 104-a and second device 104-b may be examples of chips—e.g., system 100 may be an example of a multi-chip module or a chip-to-chip (C2C) interconnect. In such examples, the devices 104 may be single chips or stacks of chips. In some examples, devices 104 may include a graphics processing unit (GPU), a switch (e.g., a high-speed network switch), a network adapter, a central processing unit (CPU), etc., to execute commands or functions received from the hosts 102. Each device 104 may include a transceiver 125 for sending and receiving signals, for example, data signals. The data signals may be digital or optical signals modulated with data or other suitable signals for carrying data. Each transceiver 125 may include a receiver 135 and a transmitter 130. The transmitter 130 includes suitable software and/or hardware for receiving digital data from the digital data source 140 and outputting data signals according to the digital data for transmission over the link 106 to a receiver 135 of device 104-b. The receiver 104 of device 104-a and device 104-b may include suitable hardware and/or software for receiving signals, for example, data signals from the link 106.

In an embodiment, devices 104 may communicate bi-directionally—e.g., from host 102-a to host 102-b or from host 102-b to host 102-a. In some examples, each receiver 135 or transmitter 130 of devices 104 may operate independently and/or simultaneously. For example, receiver 135-a of first device 104-a may receive data from transmitter 130-b of second device 104-b simultaneously with transmitter 130-a of first device 104-a transmitting data to receiver 135-b of second device 104-b.

Each transmitter 130 and receiver 135 in devices 104 may include a transaction layer (TL). In some examples, the TL 108 of the transmitter 130 may be configured to request a transaction—e.g., request the transmission of data. For example, the TL 108 of the transmitter 130 may communicate functions to or assemble data packets for other components of the devices 104. In some examples, the TL 108 of the transmitter 130 may generate a transaction layer packet (TLP) that may be transmitted to the DL 110 for further processing. In some examples, each receiver 135 in devices 104 may also include a transaction layer 114. In some examples, the TL 114 of the receiver 135 may be configured to complete a transaction—e.g., complete the transmission of data. For example, the TL 114 of the receiver 135 may receive functions from or disassemble packets received from other components of the receiver of each device 104. In some embodiments, the TL 114 of the receiver 135 may verify an incoming TLP packet to ensure the packet received is valid—e.g., without errors.

Each transmitter 130 and receiver 135 in devices 104 may also include a data-link layer. In some examples, the DL 110 and DL 116 may be configured to ensure data being sent across the link 106 is correct and without errors. For example, the DL 110 of the transmitter 130 may encode a respective frame or packet transmitted with an error code—e.g., a CRC value. The DL 116 of the receiver 135 may generate an error code based on the received frame and decode the CRC embedded in the frame to compare whether the generated error code matches the transmitted CRC. In some examples, the DL 116 performs the error decode operation to see if the data received is correct and without errors. In some examples, the DL 110 of the transmitter 130 may be configured to add a sequence number as a header to each frame or packet transmitted, and the DL 116 of the receiver 135 may be configured to check the sequence number as well. In some examples, the DL 110 of the transmitter 130 and DL 116 of the receiver 135 may include, or be coupled with, controllers or control flow units (e.g., the processing circuitry 145) to perform the error decode operations on packets or frames received.

Additionally, each transmitter 130 and receiver 135 in devices 104 may include a physical layer (PL). In some examples, the PL 112 and PL 118 may be configured to transmit and receive data across the link 106. For example, the PL 112 and PL 118 may include input/output (I/O) buffers, parallel-to-serial and serial-to-parallel converters, impedance matching circuitry, logic circuitry, etc., to transmit and receive data packets or frames across the link 106.

Each transceiver 125 may include a digital data source 140 and processing circuitry 145 that controls the transceiver 125. The digital data source 140 may include suitable hardware and/or software for outputting data in a digital format (e.g., in binary code and/or thermometer code). The digital data output by the digital data source 140 may be retrieved from memory (not illustrated) or generated according to input (e.g., user input).

The processing circuitry 145 may comprise software, hardware, or a combination thereof. For example, the processing circuitry 145 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 145 may comprise hardware, such as an application-specific integrated circuit (ASIC). Other non-limiting examples of the processing circuitry 145 include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitry 145 may be provided on a Printed Circuit Board (PCB) or collection of PCBs. It should be appreciated that any appropriate type of electrical component or collection of electrical components may be suitable for inclusion in the processing circuitry 145. The processing circuitry 145 may send and/or receive signals to and/or from other elements of the transceiver 125 to control an overall operation of the transceiver 125.

The transceiver 125 or selected elements of the transceiver 125 may take the form of a pluggable card or controller for the device 104. For example, the transceiver 125 or selected elements of the transceiver 125 may be implemented on a network interface card (NIC).

The link 106 may be a communication network that may be used to connect the devices 104, such as an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), a Peripheral Component Interconnect Express (PCIe), variants thereof, and/or the like. In one specific, but non-limiting example, the link 106 is a network that enables data transmission between the devices 104 using data signals (e.g., digital, optical, wireless signals).

In an embodiment, link 106 may be configured to transmit requests, data, functions, commands, etc., between the first device 104-a and the second device 104-b. In one example, link 106 may be cables, printed circuit boards, links, wireless, connections, etc. In at least one embodiment, the link 106 may be an example of a ground-referenced signaling (GRS) interconnect. In such examples, the link 106 may include RC-dominated channels and LC transmission lines. Additionally, the GRS interconnect may be an on-chip link, a link across a substrate (e.g., organic package), or link signaling over a printed circuit board (PCB). In some examples, GRS may use a ground network as a signal reference voltage—e.g., ground may be the return signaling. Although not explicitly shown, it should be appreciated that hosts 102 and devices 104 may include other processing devices, storage devices, and/or communication interfaces generally associated with computing tasks, such as sending and receiving data.

In some examples, each DL 110 of the transmitter 130 and each DL 116 of the receiver 135 includes chip trigger logic 150. In some embodiments, the chip trigger logic 150 of the DL 110 of the transmitter 130 is configured to pack a cross-chip trigger (e.g., an indication of a debug operation) in a data frame. In such embodiments, the chip trigger logic 150 of the DL 110 of the transmitter 130 can store the data frame with the cross-chip trigger in a buffer and transmit the cross-chip trigger across the link 106—e.g., DL 110-a of transmitter 130-a can pack a cross-chip trigger in a data frame and transmit the data frame across the link 106 to device 104-b. In some embodiments, the chip trigger logic 150 of DL 110 of the transmitter 130 can pack the cross-chip trigger in response to receiving a debug trigger, receiving an external trigger, or generating an internal trigger as described with reference to FIGS. 3 and 4. In at least one embodiment, the chip trigger logic 150 of the DL 116 of the receiver 135 is configured to receive data frames, decode data frames, and determine if the data frames include a cross-chip trigger. In some embodiments, the DL 116 of the receiver 135 is configured to store data frames that include the cross-chip trigger. In some embodiments, the cross-chip trigger can be sent from DL 110 of the first device 104-a to DL 116 of the second device 104-b as described with reference to FIG. 3. In some embodiments, the cross-chip trigger can be sent from DL 110 of the first device to DL 116 of the first device via the second device 104-b as described with reference to FIG. 4. In either case, the communication system 100 can transmit the cross-chip trigger in-band— e.g., transmit the cross-chip trigger over link 106 associated with data communications between first device 104-*a* and second device 104-*b*.

Figure 2:
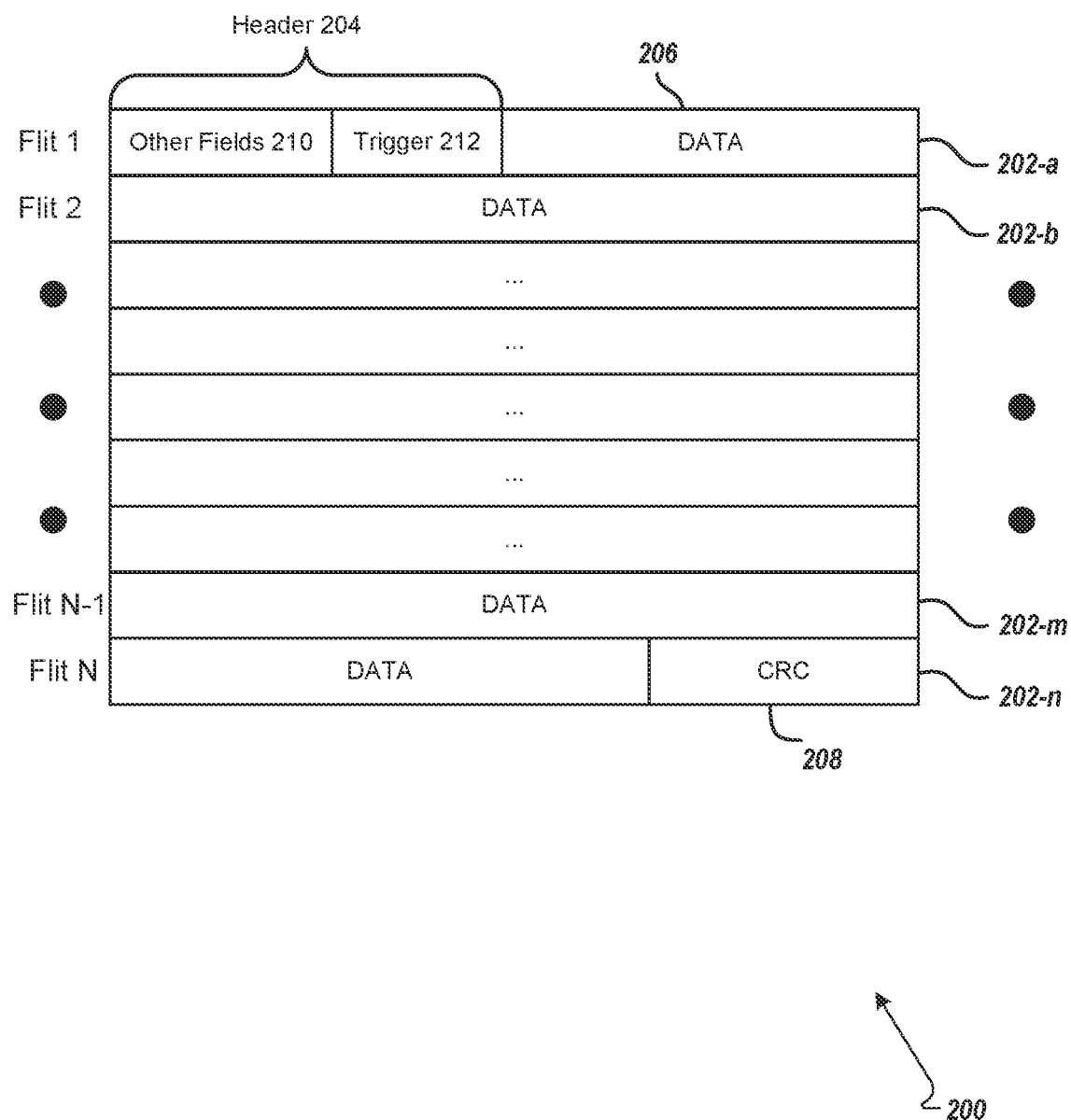
FIG. 2 illustrates an example frame communicated in a communication system, in accordance with at least some embodiments.

FIG. 2 illustrates an example frame 200 communicated in communication system 100 as described with reference to FIG. 1. For example, frame 200 can be transmitted by the transmitter 130 to the receiver 135 from either device 104-*a* to 104-*b* or from device 104-*b* to device 104-*a*. In an embodiment, frame 200 can include "N" flits 202. For example, a given frame 200 may include ten (10) flits 202. In some examples, each flit 202 may include a same quantity of bits—e.g., each flit 202 is "X" bits wide. For example, each flit 202 may be 128 bits wide. In some examples, the DL 110 of the transmitter 130 may transmit one (1) flit per each clock cycle. Accordingly, each frame may be transmitted in "N" clock cycles based on the "N" number of flits 202. Additionally, each frame 200 may include an error code CRC 208. The DL 110 is configured to generate the CRC 208 for the entire frame. In such embodiments, the DL 116 of the receiver 135 is configured to perform an error decode operation across the "N" flits 202 for each frame 200—e.g., the chip trigger logic 150 is configured to perform one error decode operation after receiving "N" flits 202 corresponding to a size or width of the frame 200. That is, the error decode operation is performed at a frame granularity—e.g., a frame error rate (FER) is determined. In some embodiments, the frame 200 can include one (1) flit 202. In such embodiments, the error decode operation can essentially be performed at a flit granularity as each frame 200 includes one (1) flit 202. In some embodiments, the DL 110 of the transmitter 130 can generate a different error detection code—e.g., an error detection code other than CRC. For example, the DL 110 of the transmitter 130 can generate a parity check or a checksum. In either example, the error detection code selected by the transmitter 130 can be embedded within the frame 200 and transmitted to the DL 116 of the receiver 135.

Each frame 200 may also include a header 204. In some embodiments, the header 204 can include a trigger 212 (e.g., a cross-chip trigger) and other fields 210 (e.g., information associated with frame 200). In some embodiments, trigger 212 can be a field reserved to encode trigger information. In at least one embodiment, the chip trigger logic 150 of DL 110 can write one or more bits to the trigger 212 to indicate a cross-chip trigger. That is, the trigger 212 can be a multi-bit field that indicates a type of trigger embedded in the data frame 200. For example, the trigger 212 can be a two (2) bit field indicating a debug trigger, an external trigger, an internal trigger, or no trigger as described with reference to FIGS. 3 and 4. In other embodiments, the trigger 212 can indicate a system-level debug operation or an operation to assess a quality of the link 106. Accordingly, the chip trigger logic 150 can write one or more bits of the trigger 212 to indicate the type of trigger (or lack thereof) within the data frame 200. In at least one embodiment, the chip trigger logic 150 of DL 116 can receive an incoming data frame 200, decode the header 204, and determine if the data frame 200 includes the cross-chip trigger—e.g., determine whether one or more bits of the trigger 212 indicate the cross-chip trigger. By writing one or more bits to the trigger 212, the communication system 100 can transmit cross-chip triggers in-band. For example, the chip trigger logic 150 writes the cross-chip trigger in the trigger 212, which is included in the data frame 200 transmitted between device 104-*a* and device 104-*b* across link 106.

Figure 3:
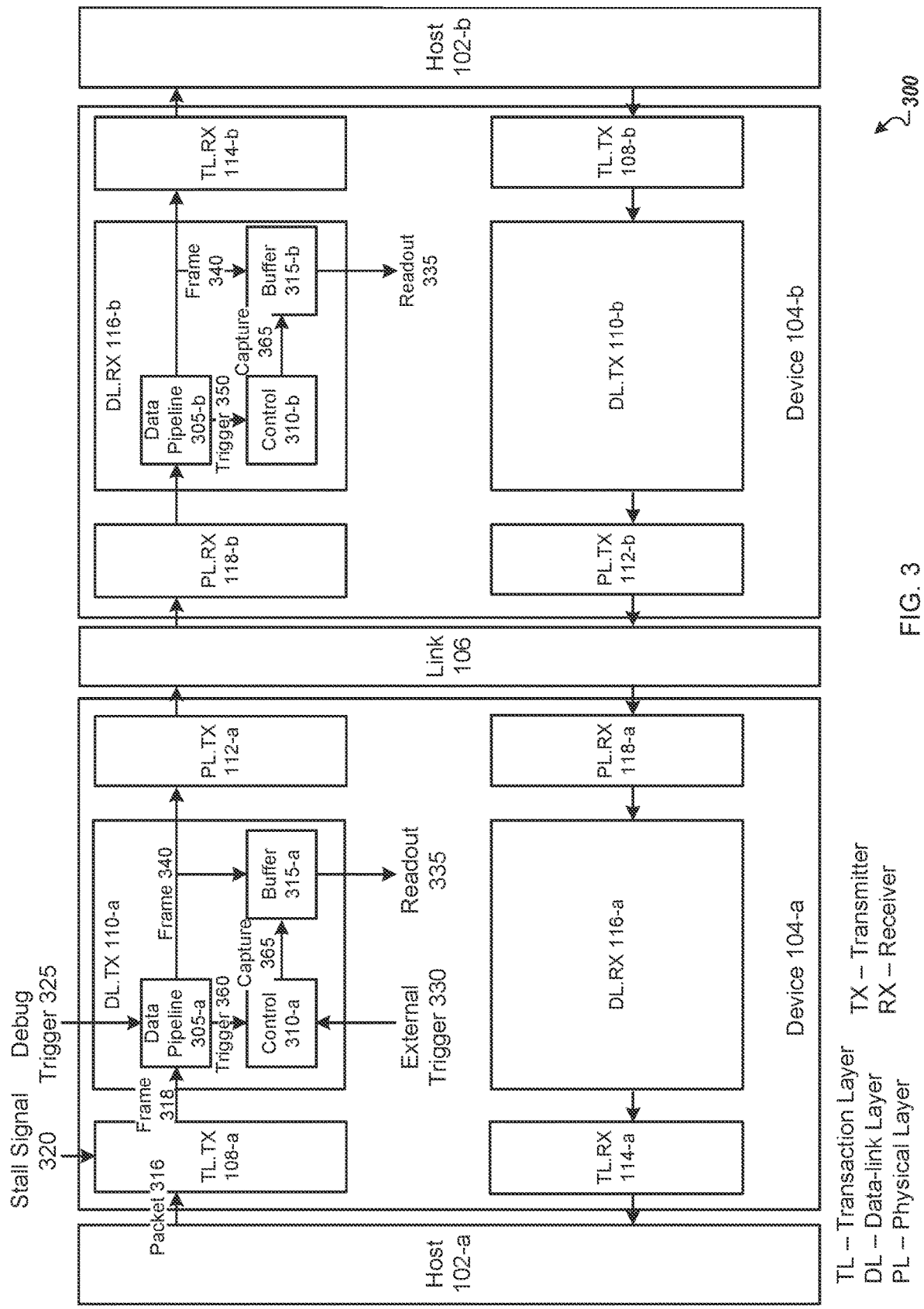
FIG. 3 is an example communication system transmitting an in-band cross-chip trigger, in accordance with at least some embodiments.

FIG. 3 illustrates an example communication system 300 according to at least one example embodiment. In some embodiments, the communication system 300 can be an example of communication system 100 as described with reference to FIG. 1. For example, system 300 can include a host 102-*a*, a host 102-*b*, a first device 104-*a*, and a second device 104-*b*. as described with reference to FIG. 1. In at least one embodiment, the system 300 also includes a link 106 coupling the first device 104-*a* and the second device 104-*b*. Each device 104 can include a transaction layer (TL) 108, a data-link layer (DL) 110, and a physical layer (PL) 112 associated with a transmitter (e.g., transmitter 130 as described with reference to FIG. 1). Each device 104 can include a TL 114, a DL 116, and a PL 118 associated with a receiver (e.g., receiver 135 as described with reference to FIG. 1). In at least one embodiment, the DL 110 of the transmitter can include data pipeline 305-*a*, a control 310-*a*, and a buffer 315-*a*—e.g., although not illustrated, DL 110-*b* of a transmitter of device 104-*b* can also include data pipeline 305-*a*, a control 310-*a*, and a buffer 315-*a*. In some embodiments, the DL 116 of the receiver can include data pipeline 305-*b*, a control 310-*b*, and a buffer 315-*b*—e.g., although not illustrated, DL 116-*a* of a receiver of device 104-*a* can also include data pipeline 305-*b*, a control 310-*b*, and a buffer 315-*b*. In one embodiment, communication system 300 can illustrate an example of transmitting a data frame including a cross-chip trigger from device 104-*a* to device 104-*b* for a debug operation. Although not illustrated, device 104-*b* can also transmit a cross-chip trigger to device 104-*a* for a debug operation.

In at least one embodiment, host 102-*a* is configured to communicate data with host 102-*b*. In such embodiments, the host 102-*a* can transmit data packets 316 that includes the data to be communicated to device 104-*a*—e.g., to TL 108-*a* of the transmitter.

In some embodiments, the TL 108-*a* of the transmitter is configured to receive the data packet 316 from the host 102-*a*. In at least one embodiment, the TL 108-*a* of the transmitter can assemble the packet 316 received from the host 102-*a* into a data frame 318—e.g., an example of data frame 200 as described with reference to FIG. 2. In at least one embodiment, the data packet 316 received from the host 102-*a* can indicate that the data packet 316 is associated with a cross-chip trigger. In such embodiments, the TL 108-*a* of the transmitter can assemble data frame 318 with an indication that the data frame is associated with a cross-chip trigger. In some embodiments, the software stack of device 104-*a* can program the TL 108-*a* to generate an indication (e.g., cross-chip trigger) for a specific data packet 316. In such embodiments, the TL 108-*a* of the transmitter can compare a first set of bits received in each data packet 316 with the specified data packet. When the first set of bits received in a data packet 316 from the host 102-*a* match (e.g., satisfy) the specified data packet, the TL 108-*a* can generate the indication of a cross-chip trigger when assembling data frame 318. In at least one embodiment, the TL 108-*a* of the transmitter can receive a stall signal 320 from a software stack, firmware, or controller (e.g., finite state machine (FSM)) of device 104-*a*. In such embodiments, the stall signal 320 can indicate to the TL 108-*a* to stall the link 106 until a debug operation is complete—e.g., stall the link 106 until a second stall signal 320 is received indicating to resume operations on link 106. When the TL 108-*a* receives the stall signal 320, the TL 108-*a* of the transmitter is configured to refrain from assembling packets 316 received from host 102-*a*—e.g., the TL 108-*a* can suspend operations. When the TL 108-*a* receives the second stall signal 320, the TL 108-*a* of the transmitter can resume operations—e.g., resume assembling packets 316 received from the host 102-*a*. That is, in some embodiments, the software stack of device 104-a can perform a debug operation utilizing data already being transmitted and refrain from stalling the link 106. In other embodiments, the software stack of device 104-a can perform a debug operation by stalling the link 106 and utilizing custom data (e.g., data generated by the software stack of device 104-a) for the debug operation as described with reference to the data pipeline 305-a.

In at least one embodiment, data pipeline 305-a is configured to receive data frame 318 from the TL 108-a of the transmitter. In some embodiments, the data pipeline 305-a is configured to sample and decode data frame 318. In embodiments where the TL 108-a assembles the data frame 318 with the indication that the data frame is associated with the cross-chip trigger, the data pipeline 305-a (e.g., a component of the data pipeline 305-a) can identify the cross-chip trigger when sampling and decoding the data frame 318. In such embodiments, the data pipeline 305-a can write one or more bits to a trigger field (e.g., trigger 212 as described with reference to FIG. 2) indicating the cross-chip trigger, and generate a data frame 340 including the cross-chip trigger. In some embodiments, the cross-chip trigger indicated by the host 102-a (e.g., the indication in data frame 318) can be associated with a system-level debug. In such embodiments, the data pipeline 305-a can write the one or more bits to the trigger field to indicate a system-level debug operation. In some embodiments, the data pipeline 305-a can transmit the data frame 340 to the PL 112-a of the transmitter. When the data pipeline 305-a transmits the data frame 340 (e.g., a data frame with a cross-chip trigger), the data pipeline 305 can transmit a trigger 360 to control 310-a indicating the data frame includes a cross-chip trigger.

In some embodiments, the data pipeline 305-a is configured to receive a debug trigger 325 from a software stack (e.g., or from firmware) of device 104-a. In at least one embodiment, the software stack can transmit the debug trigger 325 to the data pipeline 305-a to mark an incoming data frame 318 as a cross-chip trigger data frame—e.g., the debug trigger 325 can be a bit indicating a received data frame 318 is a cross-chip trigger data frame. In such embodiments, the data pipeline 305-a can write one or more bits to the trigger field of the received data frame 318 to generate a data frame 340 with the cross-chip trigger. Additionally, in such embodiments, the software stack of device 104-a can refrain from stalling the link 106—e.g., refrain from transmitting the stall signal 320. That is, the software stack of the device 104-a can utilize data already being transmitted (e.g., already transmitted by the host 102-a) for the debug operation. Accordingly, the debug operation can occur in parallel to data being transmitted and the performance of communication system 300 is not reduced.

In at least one embodiment, the software stack of device 104-a can transmit the debug trigger 325 and transmit the stall signal 320. In such embodiments, the software stack of device 104-a can generate a data vector to transmit from device 104-a to device 104-b to assess a quality of link 106. For example, the software stack of device 104-a can generate a data vector to test various pins of the link 106 (e.g., a data vector designed to test a first pin of the link 106 or a data vector designed to test a group of pins of the link 106), generate a data vector to test a data lane of link 106 (e.g., a data vector designed to test a first data lane of the link 106), generate a data vector to test transitions at each pin of the link 106, etc. For example, the software stack of device 104-a can generate a data vector that transmits different data at each data lane to test if each data lane of link 106 is reliably communicating data without errors. When the software stack of device 104-a generates the data vector, the software stack can transmit the data vector to TL 108-a first or transmit the data vector directly to the data pipeline 305-a—e.g., the software stack can transmit the generated data vector to the data pipeline 305-a via the debug trigger 325 interface.

In at least one embodiment, the software stack of device 104-a can program the data pipeline 305-a to generate a trigger 360 (e.g., an internal trigger) for a specific data packet 318. In such embodiments, the data pipeline 305-a can compare a first set of bits received in each data frame 318 (e.g., the first few bits of flit 202-a) with the specified data frame. When the first set of bits received in a data frame 318 from the TL 108-a of the transmitter match (e.g., satisfy) the specified data frame, the data pipeline 305-a can write one or more bits to the trigger field to generate data frame 340. In such embodiments, the data pipeline 305-a can further generate trigger 360 (e.g., an internal trigger) and transmit the trigger 360 to the control 310-a. In some embodiments, the data pipeline 305-a can generate the trigger 360 based on other conditions programmed by the software stack of device 104-a. For example, the software stack can program the data pipeline 305-a to generate a trigger 360 for periodically assessing the quality of link 106—e.g., generate trigger 360 after a specified period (e.g., after an hour) or after a specified number of data frames 318 are received (e.g., after receiving five (5) data frames 318). In such embodiments, the data pipeline 305-a can also write one or more bits to the trigger field of data frame 318 to generate data frame 340 with the cross-chip trigger and transmit the data frame 340 to the PL 112-a of the transmitter. In some embodiments, the data pipeline 305-a is configured to generate the internal trigger 360 when replaying a data frame 340 corrupted by the link 106. For example, if a data frame 340 including a cross-chip trigger is corrupted by the link 106 (e.g., fails to be correctly received at the device 104-b), the data pipeline 305-a can replay the corrupted data frame 340. In such embodiments, the data pipeline 305-a can generate the data frame 340 again and generate the internal trigger 360 to indicate to the control 310-a that the replayed data frame 340 includes the cross-chip trigger.

In some embodiments, the data pipeline 305-a can be configured to identify that there are no cross-chip triggers associated with an incoming data frame 318. In such embodiments, the data pipeline 305-a can refrain from generating trigger 360. Additionally, the data pipeline 305-a can write one or more bits to the trigger field to indicate there are no cross-chip triggers associated with the data frame 318 and transmit the frame to the PL 112-a of the transmitter. In some embodiments, the data pipeline 305-a can refrain from writing any bits of the trigger field—e.g., the data frame 318 assembled by the TL 108-a can already indicate there is no cross-chip trigger.

In at least one embodiment, control 310-a (e.g., a controller or FSM) is configured to receive the trigger 360 from the data pipeline 305-a. In at least one embodiment, the control 310-a can generate a capture 365 command in response to receiving the trigger 360. In some embodiments, the control 310-a can generate the capture 365 command to indicate to the buffer 315-a to store a data frame 340 transmitted by the data pipeline 305-a—e.g., the control 310-a can generate the capture 365 command each time a data frame includes a cross-chip trigger. In at least one embodiment, the control 310-a can be configured to receive an external trigger 330. In some embodiments, the control 310-a can receive the external trigger 330 from a peer block or hardware components not coupled to the link 106—e.g., from hardware components not coupled to a transceiver of device 104-*a* or device 104-*b*. For example, the control 310-*a* can receive the external trigger 330 from debug logic or error circuitry. In at least one embodiment, the external trigger 330 can indicate to the control 310-*a* to indicate a cross-chip trigger for a data frame 318 received at the data pipeline 305-*a*. In such embodiments, the control 310-*a* can transmit a command to the data pipeline 305-*a* to write one or more bits to the trigger field of an incoming or received data frame 318—e.g., to write one or more bits to indicate the data frame 318 is associated with an external cross-chip trigger. In such embodiments, the data pipeline 305-*a* can write the one or more bits, generate the data frame 340 indicating the external cross-chip trigger and transmit the data frame 340. Additionally, the control 310-*a* can generate the capture 365 command and transmit the capture 365 command to the buffer 315-*a*.

In at least one embodiment, the buffer 315-*a* is configured to store a data frame 340 transmitted by the data pipeline 305-*a* in response to receiving the capture 365 command from the control 310-*a*—e.g., the buffer 315-*a* is configured to store each data frame 340 including the cross-chip trigger. In at least one embodiment, the DL 110 of the transmitter can include more than one buffer 315-*a*—e.g., the DL 110 can include an arrangement of buffers 315-*a* configured to store the data frames 340 including the cross-chip triggers. In some embodiments, the size of buffers 315-*a* (e.g., an amount of data buffers 315 store) can depend on a margin of error for device 104-*a*. For example, if the data pipeline 305-*a* accurately marks data frames 318 as cross-chip triggers, the buffer 315-*a* can be shallow (e.g., have a smaller size)—e.g., the buffer 315-*a* can store just the data frames 340 including cross-chip triggers when they are accurately determined. In at least one embodiment, the software stack of device 104-*a* can read out the data frames 340 stored in the buffer 315-*a* as described below. In at least one embodiment, the buffer 315-*a* can be in close physical proximity to the PL 112-*a* of the transmitter. Accordingly, the respective software stack of the device 104-*a* can determine if an error that occurs is associated with the link 106 (e.g., the physical layer) or if the error occurs elsewhere.

In at least one embodiment, the PL 112-*a* of the transmitter is configured to transmit the data frame 340 received across the link 106 to device 104-*b*. In at least one embodiment, the PL 118-*b* of a receiver of device 104-*b* is configured to receive data frame 340 and transmit the data frame 340 to the DL 116-*b* of the receiver. In at least one embodiment, the link 106 is an example of a GRS link as described with reference to FIG. 1. In other embodiments, the link 106 can be an example of an Ethernet network or standardized interconnects (e.g., PCIe).

In some embodiments, the data pipeline 305-*b* of the receiver at device 104-*b* is configured to receive the data frame 340 from the PL 118-*b* of the receiver. In at least one embodiment, the data pipeline 305-*b* is configured to sample and decode the data frame 340 received. In at least one embodiment, the data pipeline 305-*b* is configured to identify the cross-chip trigger when decoding the trigger field of the data frame 340. For example, the data pipeline 305-*b* can decode the trigger field and identify no trigger, an external trigger, an internal trigger, a debug trigger, etc. In at least one embodiment, if the data pipeline 305-*b* determines the data frame 340 includes a cross-chip trigger, the data pipeline 305-*b* can generate a trigger 350. For example, the data pipeline 305-*b* can transmit the trigger 350 to the control 310-*b* to indicate the received data frame 340 includes a cross-chip trigger.

In some embodiments, the data pipeline 305-*b* is configured to perform an error detection (e.g., error correction) operation on the data frame 340 received. For example, the data pipeline 305-*b* can perform a cyclic redundancy check (CRC) error operation when the data frame 340 includes the CRC 208 as described with reference to FIG. 2. In at least one embodiment, the data pipeline 305-*a* can decode (e.g., unpack) the trigger field before or after the CRC operation. In at least one embodiment, the data pipeline 305-*b* can unpack the trigger field before performing the error detection operation. For example, if the debug operation is associated with assessing the quality of link 106, the data pipeline 305-*b* can be configured to unpack the trigger field (e.g., store the data frame 340 at the buffer 315-*b*) before performing the error detection operation. That is, the debug operation can be executed to determine a number of errors (e.g., a number of bits flipped) caused by the link 106. Accordingly, the data pipeline 305-*b* can store the data frame 340 at the buffer 315-*b* without performing the error detection operation to see a number of errors introduced by the link 106. In at least one embodiment, the data pipeline 305-*b* can be configured to unpack the trigger field after performing the error detection operation. For example, if the debug operation is associated with a system-level debug, the data pipeline 305-*b* can perform the error detection operation first and then unpack the trigger field. That is, the system-level debug operation can be executed to determine if a data frame is correctly transmitted from device 104-*a* to device 104-*b*, and assessing a success of the error detection operation can be a part of the system-level debug operation. In some embodiments, whether the data pipeline 305-*b* unpacks the trigger field before or after the error detection operation can be programmed by the software stack. In such embodiments, a software stack of the device transmitting the data frame 340 with the cross-chip trigger can communicate with the software stack of the other device to program the data pipeline 305 to the correct configuration. For example, the software stack of device 104-*a* can communicate to the device 104-*b* that the debug operation is to assess the quality of the link. In such embodiments, the software stack of device 104-*b* can program the data pipeline 305-*b* to perform the debug operation after unpacking the trigger field. Similarly, the software stack of device 104-*b* can program the data pipeline 305-*b* to perform the debug operation before unpacking the trigger field when the software stack of device 104-*a* indicates a system-level debug. In some embodiments, the software stack of device 104-*a* can communicate with the software stack of device 104-*b* over a side-band—e.g., a communication channel or link other than link 106.

In at least one embodiment, control 310-*b* (e.g., a controller or FSM) is configured to receive the trigger 350 from the data pipeline 305-*b*. In at least one embodiment, the control 310-*b* can generate a capture 365 command in response to receiving the trigger 350. In some embodiments, the control 310-*b* can generate the capture 365 command to indicate to the buffer 315-*b* to store a data frame 340 received by the data pipeline 305-*b*—e.g., the control 310-*b* can generate the capture 365 command each time a data frame that includes a cross-chip trigger is received. In such embodiments, the buffer 315-*b* is configured to store the received data frame 340 including the cross-chip trigger.

In at least one embodiment, the software stack of device 104-*a* and software stack of device 104-*b* are configured to perform a debug operation after a data frame 340 is stored at both the buffer 315-*a* and buffer 315-*b*—e.g., after the cross-chip trigger is transmitted and received. For example, the software stack of device 104-*a* can perform a readout 335 from buffer 315-*a* through an interface, and the software stack of device 104-*b* can perform a readout 335 from device 104-*b*. In some embodiments, the software stack of device 104-*a* and software stack of device 104-*b* can communicate results to complete the debug operation. For example, software stack of device 104-*b* can hash all entries in buffer 315-*b* and transmit a signature corresponding to the entries to the software stack of device 104-*a* via the side-band link or communication channel—e.g., because the link 106 can be associated with errors, the software stacks can refrain from communications over the link 106. In such embodiments, the software stack of device 104-*a* can compare the entries of buffer 315-*a* with the signature (e.g., the entries of buffer 315-*b*). Accordingly, the software stack of device 104-*a* can assess the quality of link 106 or execute the system-level debug. For example, the software stack of device 104-*a* can determine a number of errors by comparing the entries of buffer 315-*a* with the signature (e.g., the entries of buffer 315-*b*). If the number of errors exceeds a threshold number of errors (e.g., a maximum number of errors associated with a reliable link 106), the software of device 104-*a* can reset the link, retrain the link, or perform other operations to reduce the number of errors. In some embodiments, the number of errors can be associated with a count of bit errors or a count of flit errors. In other embodiments, the software stack of device 104-*a* can determine errors associated with pins (e.g., individual pins or groups of pins) of the link 106 or of data lanes of the link 106 based on generating the data vector and comparing the data vector received at buffer 315-*b*. In at least one embodiment, the software stack of device 104-*a* can determine how far data of interest made it in the system—e.g., determine whether data associated with a cross-chip trigger was stored at buffer 315-*a* or buffer 315-*b*. In some embodiments, the software stack of either device 104-*a* or device 104-*b* can perform the debug operation at boot or during runtime. In at least one embodiment, the software stack of the device 104-*a* can transmit the second stall signal 320 to the TL 108-*a* after completing the debug operation—e.g., the software stack of device 104-*a* can resume operations of the link 106.

In at least one embodiment, the software stack of device 104-*a* and software stack of device 104-*b* are configured to perform a maintenance operation after a data frame 340 is stored at both the buffer 315-*a* and buffer 315-*b*—e.g., after the cross-chip trigger is transmitted and received. In some embodiments, the operation corresponds to a maintenance operation associated with the link, a link quality assessment, or a link reliability determination. For example, the software stack of device 104-*a* could utilize the in-band cross-chip trigger to initiate a maintenance operation. In at least one embodiment, the software stack of device 104-*a* could perform a maintenance operation to assess the quality/reliability of the link through the cross-chip trigger. In at least one embodiment, the software stack of device 104-*a* can determine to partly or fully retrain the link—e.g., retrain the link without stopping functional data traffic. In other embodiments, the software stack of device 104-*a* can reboot the system if the retraining failed, advance the next scheduled maintenance operation based on heuristics (e.g., link quality trend over time may help detect imminent link failure), or take no action.

Figure 4:
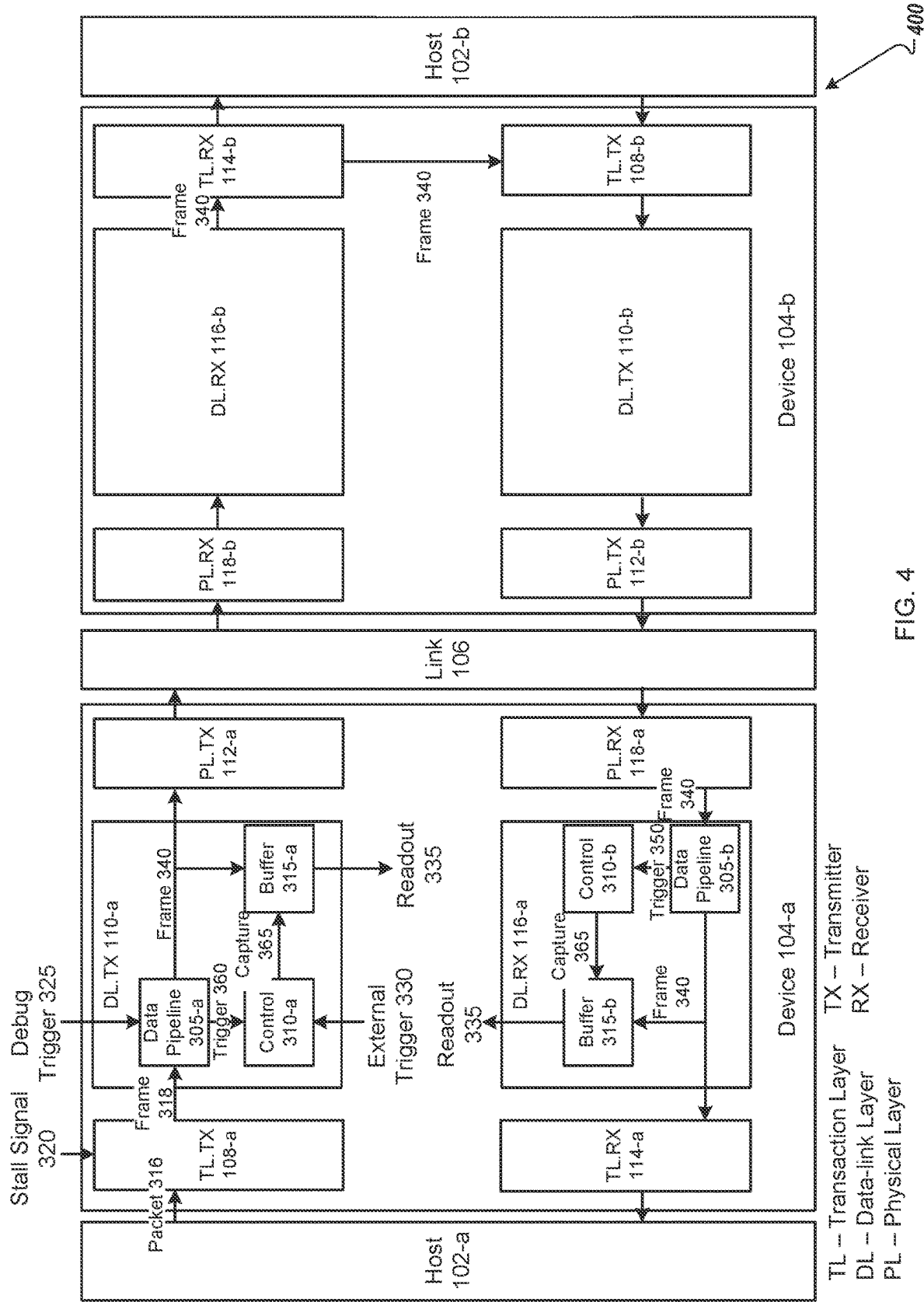
FIG. 4 is an example communication system transmitting an in-band cross-chip trigger, in accordance with at least some embodiments.

FIG. 4 illustrates an example communication system 400 according to at least one example embodiment. In some embodiments, the communication system 400 can be an example of communication system 100 or 300 as described with reference to FIGS. 1 and 3. For example, system 400 can include a host 102-*a*, a host 102-*b*, a first device 104-*a*, and a second device 104-*b*, as described with reference to FIG. 1. In at least one embodiment, the system 100 also includes a link 106 coupling the first device 104-*a* and the second device 104-*b*. Each device 104 can include a transaction layer (TL) 108, a data-link layer (DL) 110, and a physical layer (PL) 112 associated with a transmitter (e.g., transmitter 130 as described with reference to FIG. 1). Each device 104 can include a TL 114, a DL 116, and a PL 118 associated with a receiver (e.g., receiver 135 as described with reference to FIG. 1). In at least one embodiment, the DL 110 of the transmitter can include data pipeline 305-*a*, a control 310-*a*, and a buffer 315-*a* as described with reference to FIG. 3—e.g., although not illustrated, DL 110-*b* of a transmitter of device 104-*b* can also include data pipeline 305-*a*, a control 310-*a*, and a buffer 315-*a*. In some embodiments, the DL 116 of the receiver can include data pipeline 305-*b*, a control 310-*b*, and a buffer 315-*b*—e.g., although not illustrated, DL 116-*b* of a receiver of device 104-*b* can also include data pipeline 305-*b*, a control 310-*b*, and a buffer 315-*b*. In one embodiment, communication system 400 can illustrate an example of transmitting a data frame including a cross-chip trigger from device 104-*a* back to device 104-*a* for a debug operation. Although not illustrated, device 104-*b* can also transmit a cross-chip trigger back to device 104-*b* for a debug operation.

In at least one embodiment, communication system 400 illustrates an alternative method for transmitting a cross-chip trigger in-band compared to communication system 300. That is, host 102-*a*, TL 108-*a*, data pipeline 305-*a*, control 310-*a*, buffer 315-*a*, data pipeline 305-*b*, control 310-*b*, and buffer 315-*b* can perform operations as described with reference to FIG. 3. For example, data pipeline 305-*a* can write one or more bits to a trigger field of a data frame 318 to indicate a cross-chip trigger in response to receiving an indication in the data frame 318, receiving debug trigger 325, receiving an external trigger 330, or generating internal trigger 360 as described with reference to FIG. 3. In such embodiments, the data pipeline 305-*a* can transmit a trigger 360 to control 310-*a* and transmit the data frame 340 to PL 112-*a*. The control 310-*a* can transmit a capture 365 command when a trigger 360 is received and cause the buffer 315-*a* to store data frame 340—e.g., all data frames with a cross-chip trigger. Additionally, the data pipeline 305-*b* can receive data frame 340, identify the cross-chip trigger, and generate the trigger 350. In such embodiments, the control 310-*b* can transmit a capture 365 command to the buffer 315-*b* and cause the buffer 315-*b* to store data frame 340—e.g., all data frames with a cross-chip trigger.

However, rather than storing the data frame 340 at a buffer in the DL 116-*b* of device 104-*b*, communication system 400 illustrates storing the data frame 340 at the buffer 315-*b* located in the DL 116-*a* of a receiver of device 104-*a*. For example, a software stack of device 104-*a* can communicate with a software stack of device 104-*b* and indicate to transmit a data frame 340 (e.g., a data frame with a cross-chip trigger) back to device 104-*a*. In such embodiments, the software stack of device 104-*b* can program components of device 104-*b* to transmit the data frame 340 back to device 104-*a*. In other embodiments, the data pipeline 305-*a* can write one or more bits in the trigger field of the data frame 340 indicating the data frame 340 should be transmitted back to device 104-*a*. In either case, a data pipeline of DL 116-*b* can identify a data frame 340 including the cross-chip trigger and transmit the data frame 340 onto the TL 114-*b* of the receiver without storing the data frame 340 at a buffer. The TL 114-*b* of the receiver can transmit the data frame 340 to the TL 108-*b* of a transmitter at device 104-*b*. In embodiments where the data in the data frame is part of a normal operation (e.g., the data is not a data vector generated by the software stack of device 104-*a*), the TL 114-*b* can transmit the data to host 102-*b* as well. In some embodiments, the data frame 340 can then be transmitted back across the link 106 to a PL 118-*a* of the receiver at device 104-*a*. In some embodiments, the transmitter of device 104-*b* can transmit the same data frame 340 received at the receiver of device 104-*b* back to the device 104-*a*. In other embodiments, the transmitter of device 104-*b* can generate a second data frame 340 that is a copy of the data frame 340 received at the receiver of device 104-*b*.

In at least one embodiment, after the data frame 340 is stored at the buffer 315-*b* (e.g., after the data frame 340 transmitted by device 104-*a* is also received and stored at the buffer 315-*b*), the software stack of device 104-*a* can perform a readout 335 at the buffer 315-*a* and 315-*b* to execute the debug operation as described with reference to FIG. 3—e.g., determine an error count or assess the health of the link and take actions accordingly (e.g., reset the link, retrain the link, or other operations to reduce the number of errors). In at least one embodiment, because the data frame 340 is stored at the buffer 315-*a* and buffer 315-*b* of device 104-*a*, the software stack of device 104-*a* can refrain from communicating with the software stack of device 104-*b* while executing the debug operation—e.g., the debug operation can be internal to device 104-*a*. In some embodiments, device 104-*a* can include a micro-controller coupled with the buffer 315-*a* and buffer 315-*b*—e.g., an on-chip micro-controller. In such embodiments, the micro-controller can perform an at-speed assessment or debug operation—e.g., perform assessments as data frames 340 are stored in the buffer 315-*b*. For example, the micro-controller can determine a number of errors by comparing data frames 340 stored at buffer 315-*a* and buffer 315-*b*. In such embodiments, the micro-controller can transmit an indication to the software stack of device 104-*a* if the number of errors determined exceeds an error threshold. In other embodiments, the micro-controller can perform other debug operations as described with reference to FIG. 3—e.g., determine errors at a pin, group of pins, or data lanes. In such embodiments, the micro-controller can transmit results to the software stack of device 104-*a*. In at least one embodiment, utilizing the micro-controller can reduce software intervention and reduce a period to execute the debug operation.

Figure 5:
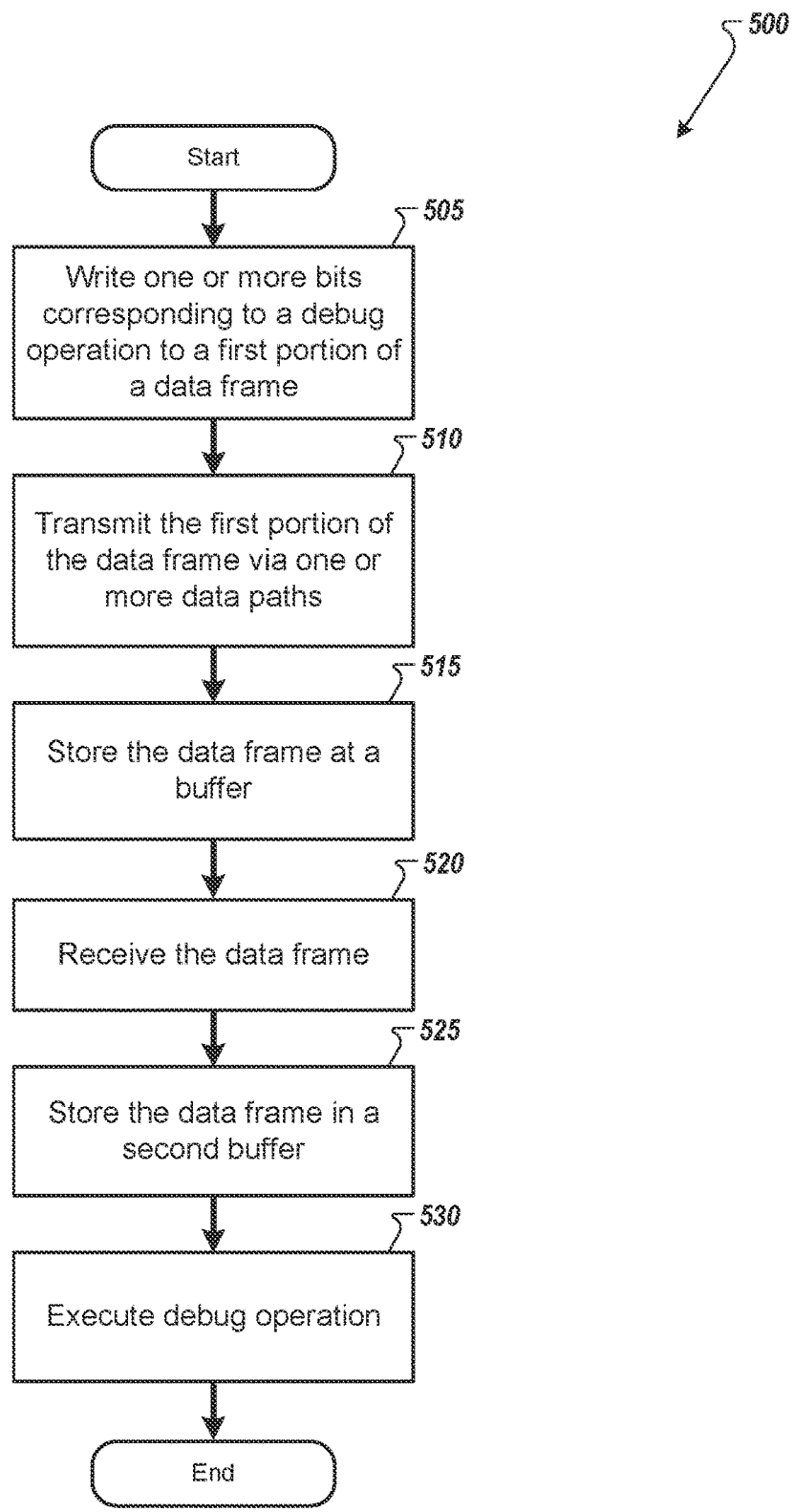
FIG. 5 is a flow diagram of a method for transmitting an in-band cross-chip trigger for a high-speed interconnect system, in accordance with at least some embodiments.

FIG. 5 illustrates an example flow diagram of a method 500 for error rate interrupts in hardware for a high-speed interconnect. The method 500 can be performed by processing logic comprising hardware, software, firmware, or any combination thereof. In at least one embodiment, the method 500 is performed by devices 104-*a* and 104-*b* of communication systems 300 and 400 described with reference to FIGS. 3 and 4—e.g., by TL 108, data pipeline 305, control 310, buffer 315, and a respective software stack or micro-controller of each device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for transmitting an in-band cross-chip trigger to maintain and debug a high-speed interconnect are possible.

At operation 505, processing logic is configured to write one or more bits corresponding to a debug operation to a first portion of a data frame in response to an indication, the data frame including a second portion comprising data. For example, the processing logic can write one or more bits to a trigger field (e.g., trigger 212) to indicate a cross-chip trigger in response to receiving an indication—e.g., receiving a debug trigger, internal trigger, or an external trigger. In some embodiments, the processing logic can determine to write the one or more bits in response to receiving and decoding a second data frame received from a transaction layer transmitter component (e.g., TL 108-*a*) and identifying an indication that the second data frame is associated with a cross-chip trigger as described with reference to FIG. 3. In some embodiments, the processing logic can be in a device coupled to a link including one or more data paths. In at least one embodiment, the processing logic can include or be coupled to a data link (DL) transmitter and a buffer. In some embodiments, the data frame can be transmitted as part of a normal operation—e.g., the data frame can include data in the second portion that a host (e.g., host 102) wants to transmit to a second device. That is, the cross-chip trigger can be sent concurrently with the data. In other embodiments, the data in the second portion can be a data vector generated by a software stack of the device. In some embodiments, the operation corresponds to a system debug operation, a maintenance operation associated with the link, a link quality assessment, or a link reliability determination. For example, the in-band cross-chip trigger could be used to initiate a maintenance operation. In at least one embodiment, the maintenance operation could commence with the processing logic assessing the quality/reliability of the link through the cross-chip trigger. In at least one embodiment, the maintenance operation can then determine to partly or fully retrain the link—e.g., retrain the link without stopping functional data traffic. In other embodiments, the maintenance operation can reboot the system if the retraining failed, advance the next scheduled maintenance operation based on heuristics (e.g., link quality trend over time may help detect imminent link failure), or take no action.

At operation 510, the processing logic can transmit the first portion and the second portion of the data frame via the one or more data paths of the link in response to writing the one or more bits corresponding to the debug operation. That is, the processing logic can transmit the cross-chip trigger in-band—e.g., on the same link associated with transmitting data. In some embodiments, when the data in the second portion is the data vector generated by the software stack, the processing logic can stall the link before transmitting the data vector to the second device as described with reference to FIG. 3.

At operation 515, the processing logic can store the data frame at the buffer in response to writing the one or more bits corresponding to the debug operation in the first portion of the data frame. For example, the processing logic can transmit a capture command (e.g., a capture 365 command as described with reference to FIG. 3) to the buffer in response to writing the one or more bits—e.g., in response to determining the data frame is associated with the cross-chip trigger. Accordingly, the buffer can store the data frame in response to receiving the capture command. In at least one embodiment, the processing logic can fail to receive an indication—e.g., the processing logic can fail to receive the debug trigger, external trigger, or internal trigger. In such embodiments, the processing logic can refrain from writing one or more bits to the first portion or write one or more bits to the first portion to indicate the data frame is not associated with a debug operation. In such embodiments, the processing logic can refrain from storing the data frame at the buffer.

At operation 520, the processing logic can receive the data frame. In some embodiments, the data frame can be received at a receiver of a second device coupled to the link via the one or more data paths. In at least one embodiment, the processing logic can receive a second data frame associated with the data frame at a receiver of the device. In such embodiments, a second device can receive the data frame via one or more data paths. In some embodiments, the second device can determine one or more bits in the first portion correspond to the debug operation responsive to receiving the data frame. In some embodiments, the second device can generate a second data frame in response to determining the one or more bits correspond to the debug operation, the second data frame comprising the one or more bits. In such embodiments, the second device can transmit the second data frame via the one or more data paths responsive to determining the one or more bits in the first portion correspond to the debug operation. That is, the second device can transmit a copy of the data frame back to the device as described with reference to FIG. 4. In some embodiments, the second device can transmit the received data frame back to the device without generating a copy—e.g., transmit the original data frame received back to the device.

At operation 525, the processing logic can store the data frame in a second buffer. For example, the processing logic can decode the data frame in response to receiving the data frame. The processing logic can determine the one or more bits in the first portion correspond to the debug operation and store the data frame in response to determining the one or more bits correspond to the debug operation. In at least one embodiment, the second buffer is in a receiver of the second device (e.g., device 104-*b*) as described with reference to FIG. 3. In at least one embodiment, the second buffer is in a receiver of the device (e.g., device 104-*a*) as described with reference to FIG. 4—e.g., the processing logic can decode the second data frame received at the device, decode the second data frame, determine one or more bits of the second data frame correspond to the debug operation, and store the second data frame at the second buffer. In some embodiments, the processing logic can determine a received data frame includes one or more bits in the first portion that do not correspond to a debug operation. In such embodiments, the processing logic can refrain from storing the data frame at the second buffer.

At operation 530, the processing logic can execute the debug operation indicated in the one or more bits. In some embodiments, if the data frame is stored at the second buffer in the second device, the debug operation can be executed at the device and second device. For example, the device can include a first set of components associated with a first software stack (e.g., a software stack of device 104-*a*), and the second device further includes a second set of components associated with a second software stack (e.g., a software stack of device 104-*b*). In such embodiments, the second set of components (e.g., the second software stack) can transmit to the first software stack via a second link (e.g., side-band link) coupled to the device and the second device, a message associated with receiving the data comprising the one or more bits corresponding to the debug operation. For example, the second set of components can transmit a signature corresponding to entries in the second buffer to the device as described with reference to FIG. 3. In some embodiments, the first software stack can compare entries of the first buffer with the signature and execute the debug operation as described with reference to FIG. 3—e.g., retrain or reset the link when a number of errors detected exceed a threshold number of errors. In some embodiments, if the second data frame is stored at the second buffer in the device, the debug operation can occur internally to the device as described with reference to FIG. 4. For example, the device can include a controller (e.g., micro-controller) coupled with the buffer and the second buffer. In some embodiments, the controller can compare the data frame with the second data frame in response to the second data frame being stored at the second buffer and perform the debug operation in response to comparing the data frame and the second data frame. In other embodiments, the software stack of the device can perform the internal debug operation. For example, the device can include a set of components associated with a software stack, and the set of components can perform the debug operation in response to the second data frame being stored at the second buffer. In either embodiment (e.g., the data frame is stored at the receiver of the second device or the second data frame is stored at the receiver of the device), the processing logic can also perform debug operations associated with a pin of the link, a group of pins of the link, or data lanes of the link as described with reference to FIG. 3.

Figure 6:
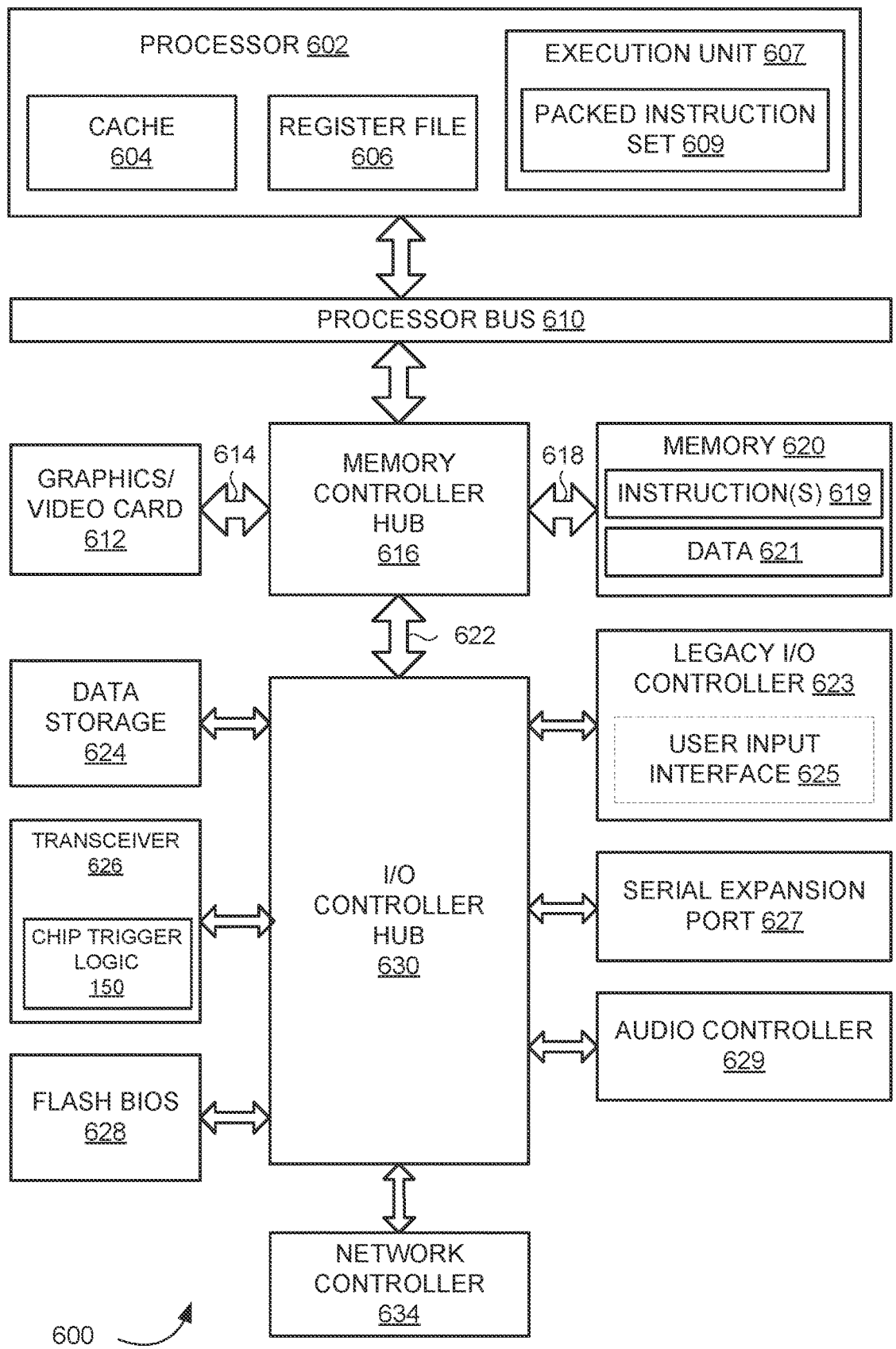
FIG. 6 illustrates an example computer system including a transceiver including a chip-to-chip interconnect for transmitting an in-band cross-chip trigger, in accordance with at least some embodiments.

FIG. 6 illustrates a computer system 600 including a transceiver including a chip-to-chip interconnect, in accordance with at least one embodiment. In at least one embodiment, computer system 600 may be a system with interconnected devices and components, an System-on-Chip (SOC), or some combination. In at least one embodiment, computer system 600 is formed with a processor 602 that may include execution units to execute an instruction. In at least one embodiment, computer system 600 may include, without limitation, a component, such as processor 602, to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and the like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as a switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single-processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside externally to processor 602. In at least one embodiment, processor 602 may also include a combination of both internal and external caches. In at least one embodiment, a register file 606 may store different types of data in various registers including, without limitation, integer registers, floating point registers, status registers, and instruction pointer registers.

In at least one embodiment, execution unit 607, including, without limitation, logic to perform integer and floating point operations, also resides in processor 602. Processor 602 may also include a microcode ("ucode") read-only memory ("ROM") that stores microcode for certain macro instructions. In at least one embodiment, execution unit 607 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using a full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, a flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub (MCH) 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and bridge data signals between processor bus 610, memory 620, and a system I/O 622. In at least one embodiment, a system logic chip may provide a graphics port for coupling to a graphics controller. In at least one embodiment, MCH 616 may be coupled to memory 620 through high bandwidth memory path 618, and graphics/video card 612 may be coupled to MCH 616 through an Advanced Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, a local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage device. In an embodiment, the transceiver 626 includes a constrained FFE 608.

In at least one embodiment, FIG. 6 illustrates a system, which includes interconnected hardware devices or "chips" in the transceiver 626—e.g., the transceiver 626 includes a chip-to-chip interconnect including the first device 104-a and second device 104-b as described with reference to FIG. 1. In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof and utilize a link 106 as described with reference to FIG. 1. In at least one embodiment, one or more components of system 600 are interconnected using compute express link ("CXL") interconnects. In an embodiment, the transceiver 626 can include chip trigger 150 as described with reference to FIG. 1. In such embodiments, the chip trigger logic 150 can enable device 104-a and device 104-b to transmit cross-chip triggers in-band—e.g., across link 106 associated with transmitting data. Accordingly, the chip trigger logic 150 can be utilized for a method and system for transmitting cross-chip triggers in-band to maintain and debug a high-speed interconnect.

Other variations are within the spirit of the present disclosure. Thus, while the disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in the appended claims.

Use of terms "a" and "an" and "the" and similar referents in the context of describing the disclosed embodiments (especially in the context of the following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,")

unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. In at least one embodiment, a set of non-transitory computer-readable storage media comprises multiple non-transitory computer-readable storage media and one or more of the individual non-transitory storage media of the multiple non-transitory computer-readable storage media lack all of the code while the multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of the present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still cooperate or interact with each other.

Unless specifically stated otherwise, it may be appreciated that throughout the specification terms such as "processing," "computing," "calculating," "determining," or the like, refer to action and/or processes of a computer or computing system, or similar electronic computing device, that manipulate and/or transform data represented as physical, such as electronic, quantities within a computing system's registers and/or memories into other data similarly represented as physical quantities within a computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, the terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from a providing entity to an acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of the described techniques, other architectures may be used to implement the described functionality, and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in the appended claims is not necessarily limited to the specific features or acts described. Rather, specific features and acts are disclosed as exemplary forms of implementing the claims.

What is claimed is:

1. A system comprising:
    a link comprising one or more data paths;
    a device coupled with the link and comprising a data link (DL) transmitter and a buffer, the device to:
      write, in response to an indication, one or more bits corresponding to an operation to a first portion of a data frame, the data frame comprising a second portion comprising data;
      transmit the first portion and the second portion of the data frame via the one or more data paths in response to writing the one or more bits corresponding to the operation; and
      store the data frame in the buffer in response to writing the one or more bits corresponding to the operation; and
    a second device coupled to the link and comprising a second buffer, the second device to:
      receive the data frame via the one or more data paths;
      decode the data frame in response to receiving the data frame;
      determine that the one or more bits in the first portion correspond to the operation; and
      store the data frame in the second buffer in response to determining the one or more bits correspond to the operation.

2. The system of claim 1, wherein:
    the device further comprises a first set of components associated with a first software stack; and
    the second device further comprises a second set of components associated with a second software stack, the second set of components to:
      transmit, to the first software stack via a second link coupled to the device and the second device, a message associated with receiving the data frame comprising the one or more bits corresponding to the operation.

3. The system of claim 1, wherein the device further comprises a data link (DL) receiver and a second buffer, the device to:
    receive a second data frame associated with the data frame;
    decode the second data frame in response to receiving the second data frame;
    determine that one or more bits of the second data frame correspond to the operation in response to decoding the second data frame; and
    store the second data frame in the second buffer in response to determining that one or more bits of the second data frame correspond to the operation.

4. The system of claim 3, wherein the device further comprises a controller coupled with the buffer and the second buffer, the controller to:
    compare the data frame with the second data frame in response to the second data frame being stored in the second buffer; and
    perform the operation in response to comparing the data frame and the second data frame.

5. The system of claim 3, wherein the device further comprises a set of components associated with a software stack, the set of components to:
    perform the operation in response to the second data frame being stored in the second buffer.

6. The system of claim 3, further comprising a second device coupled to the link, the second device to:
    receive the data frame via the one or more data paths;
    determine that the one or more bits in the first portion correspond to the operation in response to receiving the data frame;
    generate a second data frame in response to determining the one or more bits correspond to the operation, the second data frame comprising the one or more bits; and
    transmit the second data frame via the one or more data paths in response to determining the one or more bits in the first portion correspond to the operation.

7. The system of claim 1, wherein the operation corresponds to a system debug operation, a maintenance operation associated with the link, a link quality assessment, or a link reliability determination.

8. The system of claim 1, wherein the device is further to:
    receive a second data frame comprising the indication from a transaction layer transmitter, wherein writing the one or more bits is in response to receiving the second data frame.

9. The system of claim 1, wherein the device is further to:
    receive the indication, wherein writing the one or more bits is in response to receiving the indication.

10. A method comprising:
    writing, at a data link (DL) transmitter of a device in response to an indication, one or more bits corresponding to an operation to a first portion of a data frame, the data frame comprising a second portion comprising data;

transmitting the first portion and the second portion of the data frame, via one or more data paths of a link coupled with the device, in response to writing the one or more bits corresponding to the operation;
storing, in a buffer of the device, the data frame in response to writing the one or more bits corresponding to the operation;
receiving, at a second device, the data frame via the one or more data paths;
decoding, at the second device, the data frame in response to receiving the data frame;
determining, at the second device, that the one or more bits in the first portion correspond to the operation; and
storing, in a second buffer of the second device, the data frame in response to determining the one or more bits correspond to the operation.

11. The method of claim 10, further comprising:
transmitting, from a first set of components associated with a first software stack of the second device, a message to a second set of components associated with a second software stack of the device, wherein the message is transmitted via a second link coupled to the device and the second device.

12. The method of claim 10, further comprising:
receiving, at a DL receiver of the device, a second data frame associated with the data frame;
decoding the second data frame in response to receiving the second data frame;
determining one or more bits of the second data frame correspond to the operation in response to decoding the second data frame; and
storing the second data frame in a second buffer in response to determining one or more bits of the second data frame correspond to the operation.

13. The method of claim 12, further comprising:
comparing, at a controller coupled with the buffer and the second buffer, the data frame with the second data frame in response to the second data frame being stored in the second buffer; and
performing the operation in response to comparing the data frame and the second data frame.

14. The method of claim 13, further comprising:
performing, at a set of components associated with a software stack of the device, the operation in response to the second data frame being stored in the second buffer.

15. The method of claim 13, further comprising:
receiving, at a second device, the data frame via the one or more data paths;
determining, at the second device, that the one or more bits in the first portion correspond to the operation in response to receiving the data frame;
generating, at the second device, a second data frame in response to determining the one or more bits correspond to the operation, the second data frame comprising the one or more bits; and
transmitting, from the second device to the device via the one or more data paths, the second data frame in response to determining the one or more bits in the first portion correspond to the operation.

16. A system, comprising:
a link comprising one or more data paths;
a first device coupled with the link and comprising a data link (DL) transmitter and a buffer, the first device to:
write, in response to an indication, one or more bits corresponding to an operation to a first portion of a data frame, the data frame comprising a second portion comprising data;
transmit the first portion and the second portion of the data frame via the one or more data paths in response to writing the one or more bits corresponding to the operation; and
store the data frame in the buffer in response to writing the one or more bits corresponding to the operation; and
a second device coupled with the link and comprising a DL receiver and a second buffer, the second device to:
receive the data frame in response to the first device transmitting the data frame, wherein the second device is further to:
decode the data frame in response to receiving the data frame;
determine that the one or more bits of the first portion of the data frame correspond to the operation in response to decoding the data frame; and
store the data frame in the second buffer in response to determining the one or more bits correspond to the operation.

17. The system of claim 16, wherein the second device is further to:
determine that the one or more bits of the first portion of the data frame correspond to the operation in response to decoding the data frame;
generate a second data frame associated with the data frame in response to determining the one or more bits correspond to the operation, the second data frame comprising the one or more bits; and
transmit the second data frame to the first device via the one or more data paths in response to generating the second data frame.

18. A system comprising:
a link comprising one or more data paths; and
a device coupled to the link and comprising a data link (DL) transmitter and a buffer, the device to:
write, to a first portion of a data frame, one or more bits indicating a cross-chip debug trigger in response to receiving a trigger signal from any of a software stack, internal logic, or external hardware, the data frame further comprising a second portion comprising data;
transmit the data frame including the first and second portions via the one or more data paths of the link synchronously in-band; and
store the data frame in the buffer in response to writing the one or more bits.

19. The system of claim 18, further comprising a second device coupled to the link and comprising a second buffer, the second device to:
receive the data frame via the one or more data paths;
decode the data frame in response to receiving the data frame;
determine that the first portion includes the one or more bits indicating the cross-chip debug trigger; and
store the data frame in the second buffer in response to determining that the first portion includes the one or more bits indicating the cross-chip debug trigger.

20. The system of claim 18, wherein the device further comprises a data link (DL) receiver and a second buffer, the device to:
receive a second data frame associated with the data frame;

decode the second data frame in response to receiving the second data frame;

determine that one or more bits of the second data frame indicate a second cross-chip debug trigger; and store the second data frame in the second buffer in response to determining that one or more bits of the second data frame indicate the second cross-chip debug trigger.

* * * * *